(12) United States Patent
Russell

(10) Patent No.: US 9,458,644 B1
(45) Date of Patent: Oct. 4, 2016

(54) APPARATUS FOR ERECTING A HUNTING BLIND

(71) Applicant: Daniel Ross Russell, Albemarle, NC (US)

(72) Inventor: Daniel Ross Russell, Albemarle, NC (US)

(73) Assignee: Daniel Ross Russell, Albemarle, NC (US)

( * ) Notice: Subject to any disclaimer, the term of this patent is extended or adjusted under 35 U.S.C. 154(b) by 0 days.

(21) Appl. No.: 14/640,904

(22) Filed: Mar. 6, 2015

Related U.S. Application Data

(60) Provisional application No. 62/125,569, filed on Jan. 26, 2015, provisional application No. 62/125,034, filed on Jan. 12, 2015, provisional application No. 61/966,903, filed on Mar. 6, 2014.

(51) Int. Cl.
*E04H 15/04* (2006.01)
*E04H 15/00* (2006.01)
*A01M 31/00* (2006.01)

(52) U.S. Cl.
CPC ............ *E04H 15/001* (2013.01); *A01M 31/00* (2013.01); *E04H 15/04* (2013.01)

(58) Field of Classification Search
CPC ..... E04H 15/001; E04H 15/04; A01M 31/00
USPC ................ 135/161, 151, 901, 96, 90, 120.1, 135/120.4, 141; 182/135, 136, 187–188; 43/1; 248/218.4, 230.8, 311.2; 428/18–20, 23, 27
See application file for complete search history.

(56) References Cited

U.S. PATENT DOCUMENTS

| | | | | |
|---|---|---|---|---|
| 2,159,273 A | * | 5/1939 | Killinger | E04H 15/001 135/119 |
| 4,134,474 A | * | 1/1979 | Stavenau | A01M 31/02 182/116 |
| 4,813,441 A | * | 3/1989 | Kepley | A01M 31/025 135/120.1 |
| 5,669,403 A | * | 9/1997 | Belcher | A01M 31/025 135/120.4 |
| 6,086,031 A | * | 7/2000 | Renfro | A01M 31/02 182/187 |
| 6,145,528 A | | 11/2000 | Egnew et al. | |

(Continued)

OTHER PUBLICATIONS

Primos Hunting, "Stake Out Blind", 3 pages, copyright 2014, website: http://www.primos.com/products/stake-out-blind/.

*Primary Examiner* — Winnie Yip
(74) *Attorney, Agent, or Firm* — Nelson Mullins Riley & Scarborough LLP

(57) ABSTRACT

Apparatus for erecting a hunting blind, comprising a frame including at least one movable frame member for selective orientation in a configuration defining a blind outline, and a plurality of vegetation support elements spaced apart on the at least one frame member, each support element defining an opening sized and configured for insertion of an item of vegetation and having a clamping element for securing the vegetation item in an upright disposition to conceal a hunter behind the blind outline.

13 Claims, 6 Drawing Sheets

(56) References Cited

U.S. PATENT DOCUMENTS

| | | | | |
|---|---|---|---|---|
| 6,306,471 B1* | 10/2001 | Pitman | | A01M 31/00 135/901 |
| 6,543,175 B1* | 4/2003 | Tucker | | A01M 31/00 42/94 |
| 6,588,440 B2* | 7/2003 | Varnado | | A01M 31/025 135/120.1 |
| 6,779,537 B1 | 8/2004 | Miller | | |
| 7,182,091 B2* | 2/2007 | Maddox | | A01M 31/025 135/90 |
| 7,216,644 B2 | 5/2007 | Haugen | | |
| 7,219,680 B1* | 5/2007 | Gresock | | A01M 31/025 135/139 |
| 7,222,634 B2* | 5/2007 | Hess | | A01M 31/025 135/901 |
| 7,743,781 B2 | 6/2010 | Slaughter | | |
| 7,828,003 B2 | 11/2010 | Montecucco | | |
| 7,958,904 B2 | 6/2011 | Lau | | |
| 8,360,083 B2 | 1/2013 | Anders, III | | |
| 8,365,749 B2 | 2/2013 | Overbaugh | | |
| 8,640,721 B2 | 2/2014 | Mulligan | | |
| 8,938,905 B1* | 1/2015 | Moore | | A01M 31/06 239/34 |
| 2006/0249640 A1* | 11/2006 | Hanson | | A01M 31/025 248/214 |
| 2010/0229906 A1 | 9/2010 | Putman | | |
| 2013/0174826 A1 | 7/2013 | Faherty | | |
| 2013/0219768 A1 | 8/2013 | Hand | | |
| 2014/0020726 A1 | 1/2014 | Nolz et al. | | |
| 2014/0261595 A1 | 9/2014 | Mausen | | |

* cited by examiner

APPARATUS FOR ERECTING A HUNTING BLIND

CROSS-REFERENCE TO RELATED APPLICATIONS

This application claims priority from U.S. Provisional Patent Application No. 61/966,903, filed Mar. 6, 2014, entitled "(Stake Out) Folding And Telescoping Device That Expands Out To Hold Tree Or Brush", U.S. Provisional Patent Application No. 62/125,034, filed Jan. 12, 2015, entitled "(TREE JACK) Adjustable device that holds tree(s) or brush to a larger tree or object", and U.S. Provisional Patent Application No. 62/125,569, filed Jan. 26, 2015, entitled "Tree jack, S. model-pages 1 and 2, peeping tom model-pages 3 and 4", the entire contents of each of which are incorporated herein by reference.

FIELD OF THE INVENTION

The present invention relates generally to hunting products and devices and more particularly to devices and apparatus for erecting and creating a hunting blind to conceal a hunter in a selected stationary location.

BACKGROUND OF THE INVENTION

A common hunting technique is for a hunter to conceal himself in a stationery location within the vicinity in which the hunted game or fowl is expected to travel while awaiting its arrival. Typically, concealment is provided by some form of camouflaged structure commonly referred to as a hunting blind. Such blinds can be of various forms, ranging from a fixed structure to various types of portable devices which can be transported into and set up at a desired hunting location. Some of the disadvantages of many such known portable blind structures are their relative bulkiness, complexity and the time required to put up and take down the structure. Also, many structures utilize a man-made fabric or other material imprinted with a camouflage pattern which, while offering some concealment, still does not have a truly natural appearance within the surrounding environment.

SUMMARY OF THE INVENTION

It is accordingly an object of the present invention to provide an easily portable device which a hunter can use to quickly erect a blind using vegetation from the local vicinity to blend more naturally with the surrounding area to better conceal the hunter.

Briefly summarized, the present invention addresses this objective by providing an apparatus for erecting a hunting blind which basically comprises a frame including at least one movable frame member for selective orientation in a configuration defining a blind outline, and a plurality of vegetation support elements spaced apart on the frame member or members. Each vegetation support element defines an opening sized and configured for insertion of an item of vegetation and has a clamping element for securing the vegetation item in an upright disposition to conceal a hunter behind the blind outline.

Various embodiments of the invention are contemplated. The frame member or members may be pivotable relative to another frame member or another portion of the frame. For example, two, three, or a potentially greater number of frame members may be provided which are pivotable relative to one another. The frame member or members may be extendable and retractable, such as telescopically, relative to another frame member or portion of the frame. For example, the frame member may comprise sub-members that are telescopical relative to one another. The frame may comprise a central frame member with a pair of frame members telescopical in different directions relative to the central frame member. One or more of the frame members may be nestable relative to another portion of the frame.

Each vegetation support element may comprise a tubular support body attached to a frame member. One or more of the support bodies may be movable along the frame member or members for selective positioning of the support bodies relative to each other. The clamping element may be supported threadedly by the support element for selective movement into and out of the opening of the support element to engage and hold the item of vegetation therein.

The frame may be configured for self-standing placement on a ground surface or configured for mounting to a generally vertical surface. Ground-penetrating elements, e.g., stakes, may be provided for securing the frame in a selected position on the ground surface. One or more fastener elements may be provided for securing the frame in a selected position on the vertical surface, e.g., a strap for encircling the vertical surface.

In one contemplated embodiment, the apparatus comprises a frame including at least first and second frame members and a pivot connection therebetween for selective pivoting movement of the frame members relative to one another between a storage and transport disposition wherein the frame members are in adjacent parallel facing relation to each other and a use disposition wherein the frame members extend angularly with respect to one another for defining a blind outline. At least three vegetation support elements are spaced apart from one another respectively adjacent the pivot connection between the frame members and adjacent ends of the frame members distal to the pivot connection. Each support element comprises a tubular support body defining an interior opening sized and configured for insertion of an item of vegetation and a clamping element is movable relative to the opening of the support body for securing the vegetation item in an upright disposition therewithin to conceal a hunter behind the blind outline.

In another contemplated embodiment, the frame further comprises a third frame member, with a second pivot connection between the third frame member and one of the first and second frame members, and a fourth vegetation support element adjacent an end of the third frame member distal to the second pivot connection.

In a further embodiment, the apparatus comprises a frame including a central frame member having first and second legs oriented angularly to one another and first and second frame members supported telescopically by the first and second legs, respectively, for selective extending and retracting movements of the first and second frame members relative to the central frame member for defining a blind outline. At least three vegetation support elements are spaced apart from one another respectively on the central, first and second frame members, with each support element comprising a tubular support body defining an interior opening sized and configured for insertion of an item of vegetation and a clamping element movable relative to the opening of the support body for securing the vegetation item in an upright disposition therewithin to conceal a hunter behind the blind outline. Each support body may be movable along the respective frame member for selective positioning of the support bodies relative to each other.

In a still further embodiment, the apparatus comprises a frame including a central frame member configured for mounting to a generally vertical surface and first and second frame members pivoted to the central frame member for pivoting movement of the first and second frame members into a selected angular orientation relative to one another for defining a blind outline. At least two vegetation support elements are spaced apart from one another respectively on the first and second frame members, with each support element comprising a tubular support body defining an opening sized and configured for insertion of an item of vegetation and a clamping element movable relative to the opening of the support body for securing the vegetation item in an upright disposition therewithin to conceal a hunter behind the blind outline. Each support body may be movable along the respective first and second frame member for selective positioning of the support bodies relative to each other.

DETAILED DESCRIPTION OF THE INVENTION

Figure 1:
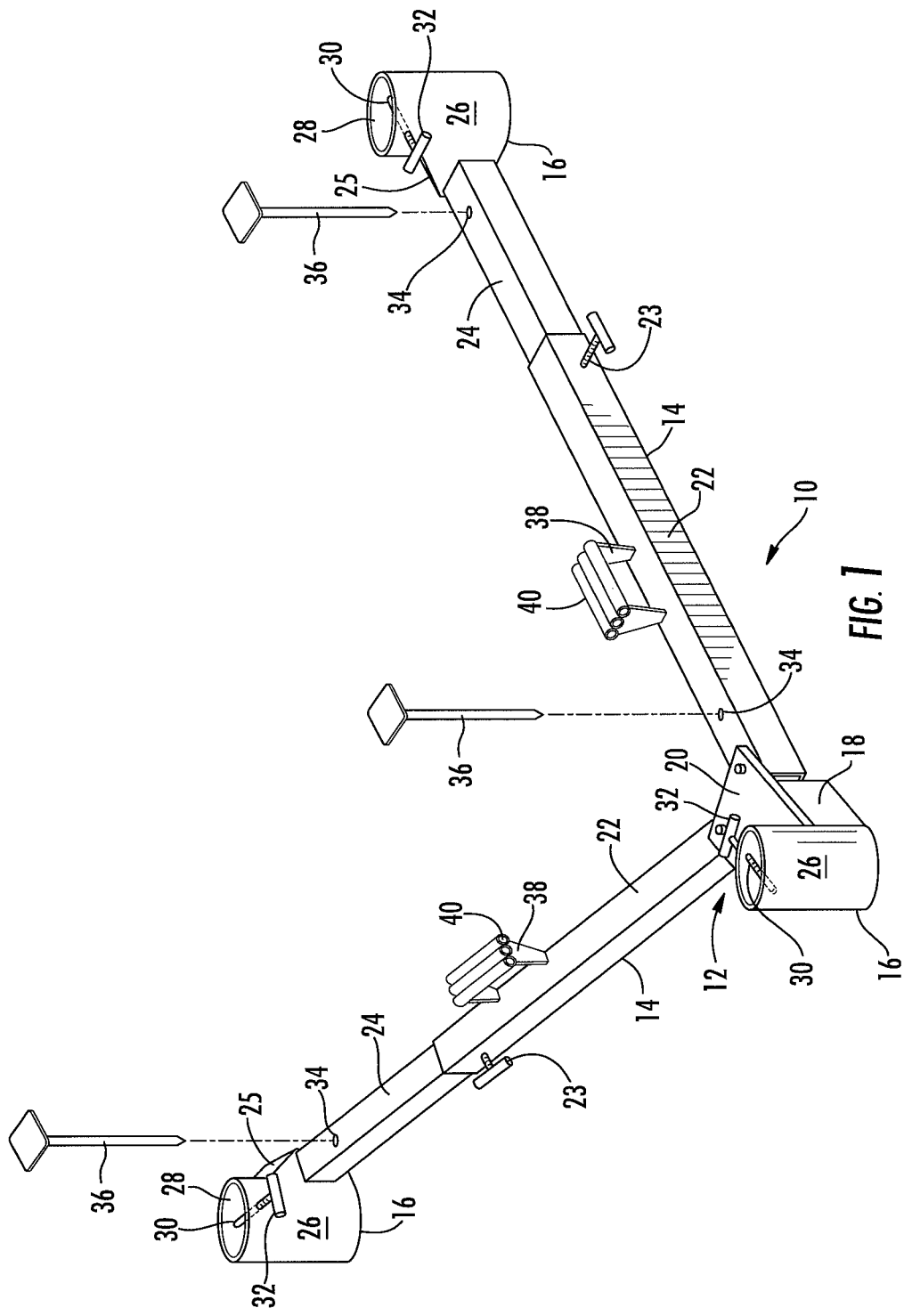
FIG. 1 is a partially exploded perspective view of a first embodiment of an apparatus for erecting a hunting blind according to the present invention, shown in an opened condition for use.
Figure 2:
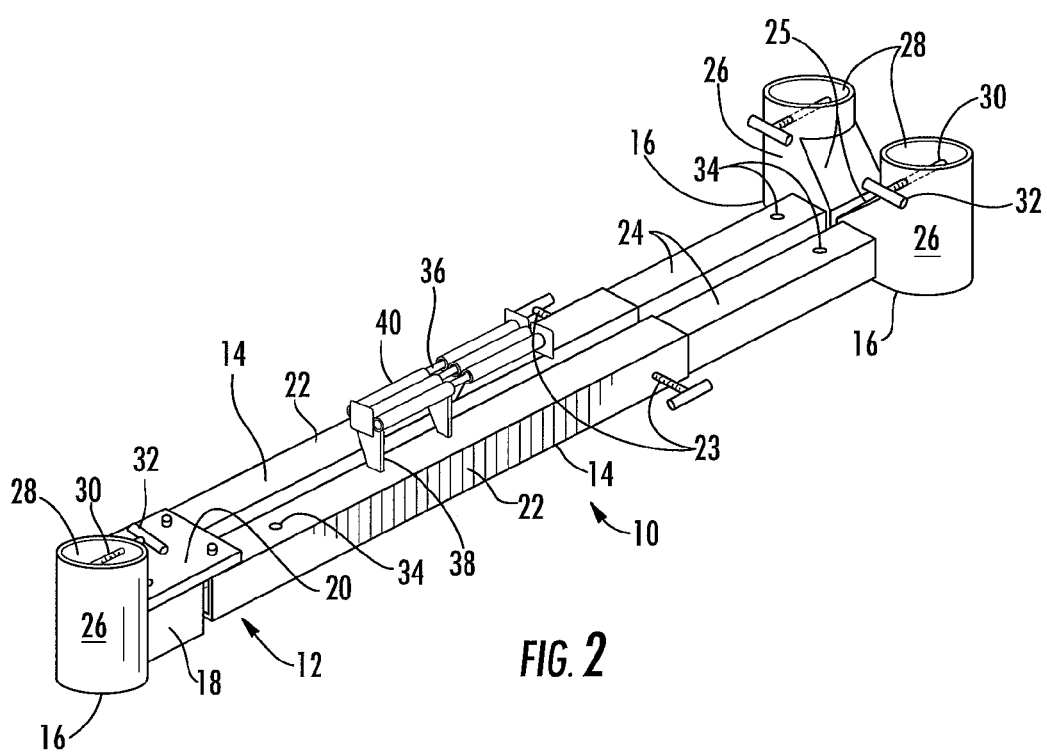
FIG. 2 is a perspective view of the hunting blind apparatus of FIG. 1, shown in a closed condition for storage and transport.
Figure 3:
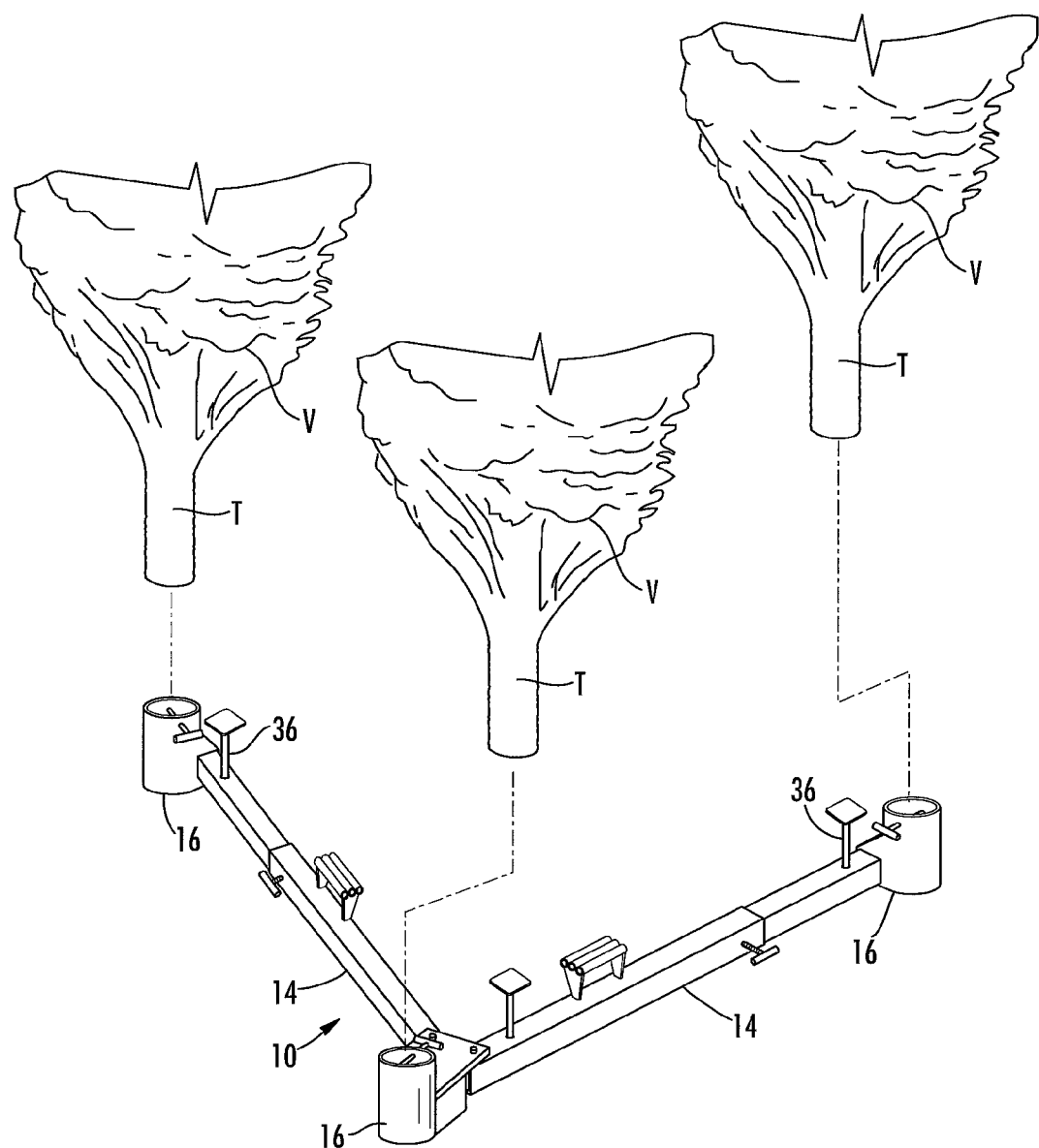
FIG. 3 is a perspective view of the hunting blind apparatus of FIG. 1, shown in use as in a hunting setting, with vegetation supported by the apparatus being shown in exploded form.

Referring now to the accompanying drawings and initially to FIGS. 1-3, a first contemplated embodiment of the present apparatus for erecting a hunting blind is indicated overall at 10 and basically comprises a frame, indicated generally at 12, having a pair of movable frame members 14 and a plurality of support elements 16 spaced apart from one another on the frame 12 for supporting vegetation V (FIG. 3), particularly whole trees and bushes, to form a hunting blind, all as more fully described hereinafter.

More particularly, the frame 12 includes a central frame block 18 with a protruding flange 20. Each frame member 14 has a main elongated tubular element 22 within which a secondary elongated tubular element 24 is supported slidably for selective telescopic extending and retracting movement. An inward end of each main tubular element 22 is pivotably secured to the flange 20 of the central frame block 18 for pivotable movement of the respective frame members 14 toward and away from one another. An outward free end of each main tubular element 22 carries a threaded bolt 23 extending laterally through the tubular element 22 with a handle 27 on its outward free end to secure the telescopical tubular elements 22, 24 relative to one another in any desired extended or retracted disposition.

In this manner, the frame members 14 may be selectively extended or retracted to a desired length and may also be selectively pivoted between a disposition shown in FIG. 2 wherein the frame members 14 are disposed in adjacent face-abutting parallel relation for storage and transport of the apparatus 10 and multiple selected use dispositions such as shown in FIGS. 1 and 3 wherein the frame members 14 are disposed angularly with respect to one another to define a selectively desired blind outline or footprint.

In the embodiment of FIGS. 1-3, three support elements 16 are affixed to the frame 12, although it is to be understood that a greater or lesser number of support elements 16 could be provided as necessary or desirable. More particularly, a first support element 16 is affixed to the frame block 18 opposite the frame members 14, and second and third support elements 16 are affixed respectively to the projecting free ends of the secondary tubular elements 24. Each support element 16 is basically sized and configured to facilitate insertion of a desired item of vegetation to conceal a hunter behind the defined blind outline of the apparatus 10. More particularly, each support element 16 in the depicted embodiment comprises an upstanding tubular support body 26 of circular cross-section defining an interior opening 28 of several inches in diameter sufficient to support a severed trunk portion T of a whole tree or bush (such as indicated in FIG. 3) or multiple tree or bush branches or limbs within each tubular support body 26. Each tubular support body 26 is affixed, for example by welding, to a lateral side of be respective frame block 18 or secondary tubular element 24 via an attachment bracket 25.

Each support element 16 further includes a clamping element adapted to securely hold the selected vegetation item or items V within the support body 26 in an upright disposition, such as a clamping bolt 30 extending threadedly through the tubular sidewall of the support body 26, with a handle 32 on the outer exposed end of the clamping bolt 30 for manually advancing and retracting the bolt 30 into and out of the open interior 28 into and out of clamping engagement with the selected vegetation item or items V.

As depicted in FIG. 3, the apparatus 10 is adapted for self-standing disposition on a ground surface, such as an open area in a field or woods at which a hunter may desire to erect a hunting blind. A selected number of holes 34 are formed vertically through the frame members 14, for example through either or both of the main and secondary tubular elements 22, 24, to receive and hold ground-penetrating stakes 36 to secure the apparatus 10 at such a selected location. A storage bracket 38 equipped with a plurality of horizontally extending tubes 40 is affixed to the top surface of each main tubular element 22 such that, when the frame members 14 are positioned adjacently in their side-by-side storage and transport disposition, the tubes 40 of the storage bracket 38 align with one another to facilitate insertion of the stakes 36. In such stored disposition, the stakes 36 additionally serve to hold the frame members 14 together in their storage and transport disposition.

As will thus be understood, the apparatus 10 is easily stored and transported in a compact configuration by a hunter to and from hunting trips, by pivoting movement of the frame members 14 into the storage and transport disposition of FIG. 2. The telescopic retraction of the secondary tubular elements 24 promotes additional compactness. The storage of the stakes 36 within the brackets 38 secures the frame members 14 against unintended pivoting movement.

In a selected field location, the apparatus 10 may be opened for use by removing the stakes 36, telescopically extending the secondary tubular elements 24 to form each frame member 14 in a desired length, securing the secondary tubular elements 24 by the retaining bolts 23, pivoting the frame members 14 away from one another into a desired angular orientation, and securing the apparatus 10 to the ground surface via penetration of the stakes 36 through the holes 34 and into the ground. The hunter then proceeds to find and cut appropriate vegetation, preferably whole trees or bushes but alternatively tree or bush branches or limbs, from the surrounding area. The tubular support bodies 26 are of a sufficiently large size of several inches in diameter to receive a severed trunk T of a tree or bush of a corresponding size up to several inches in diameter. Upon insertion of the selected trees and/or bushes into the support elements 26, and securement thereof in upstanding disposition by the clamping bolts 30, the trees and/or bushes spaced along the outline defined by the frame 12 will substantially completely conceal the hunter behind the blind outline.

Figure 4:
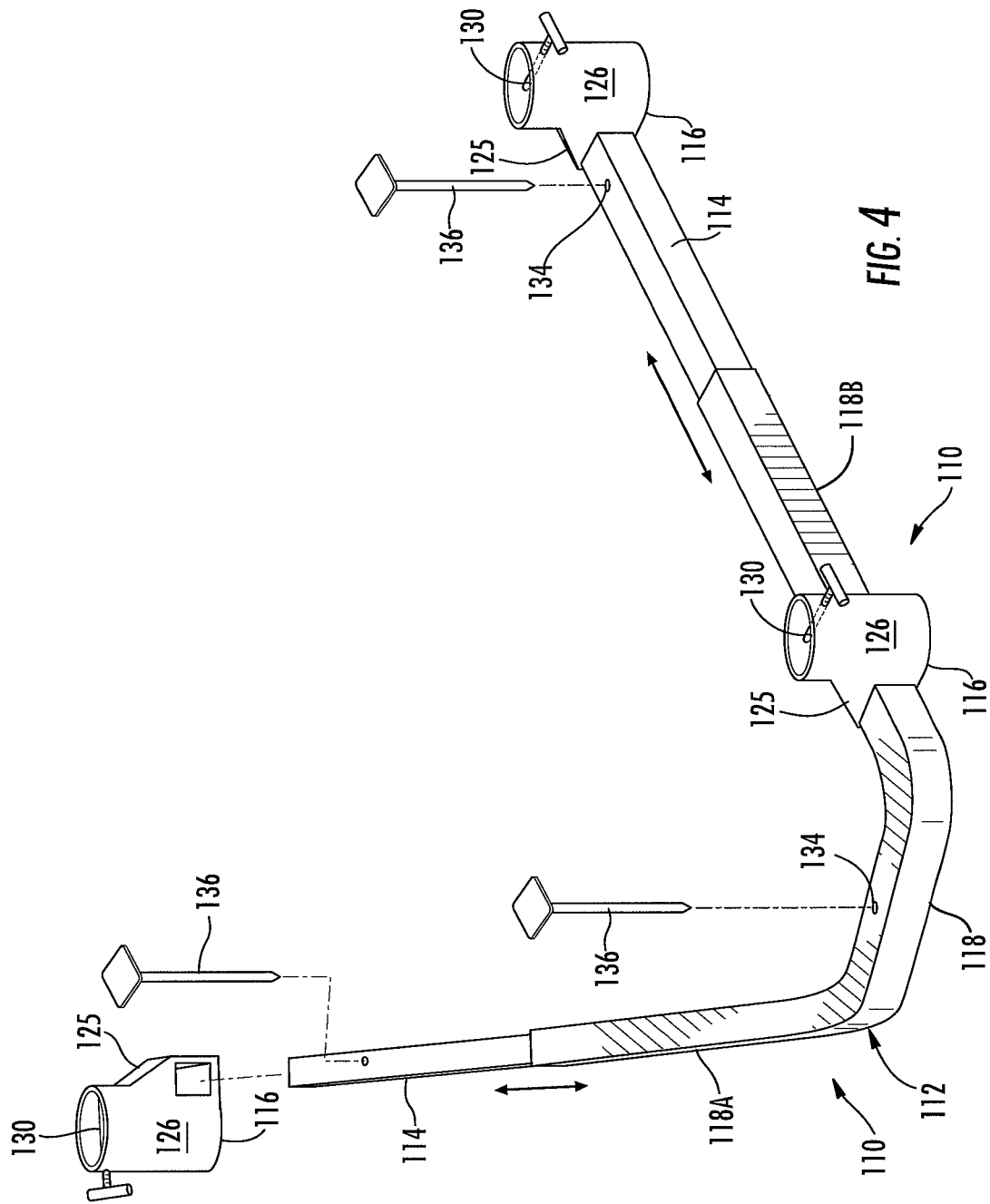
FIG. 4 is a partially exploded perspective view of a second embodiment of an apparatus for erecting a hunting blind according to the present invention.

As persons skilled in the art will recognize and understand, various additional embodiments of the present blind apparatus are possible within the scope of the present invention. For example, but without limitation on the scope and substance of the invention, three additional contemplated embodiments are depicted respectively in FIGS. 4, 5 and 6. In the embodiment of FIG. 4, a blind apparatus 110 comprises a frame 112 having a central frame member 118 of an angular tubular construction including first and second legs 118A and 118B extending angularly to one another, with first and second frame members 114 supported telescopically within the legs 118A and 118B. In this manner, the two frame members 114 may be selectively extended and retracted within the legs 118A and 118B to define a selected blind outline. Three support elements 116 in the form of tubular support bodies 126 are attached respectively to the three frame members 114, 118. In this embodiment, each support element 116 includes a tubular attachment bracket 125 by which each support element 116 may be selectively slidable along its respective frame member 114, 118 to situate the support elements 116 at differing selected spacings to one another as may be desirable in a given hunting environment. Each support element 116 includes a clamping bolt 130 extending threadedly through the tubular support body 126 to secure whole trees, bushes and/or limbs in upright disposition. Each frame member 114, 118 is formed with holes 134 to receive ground-penetrating stakes 136.

Figure 5:
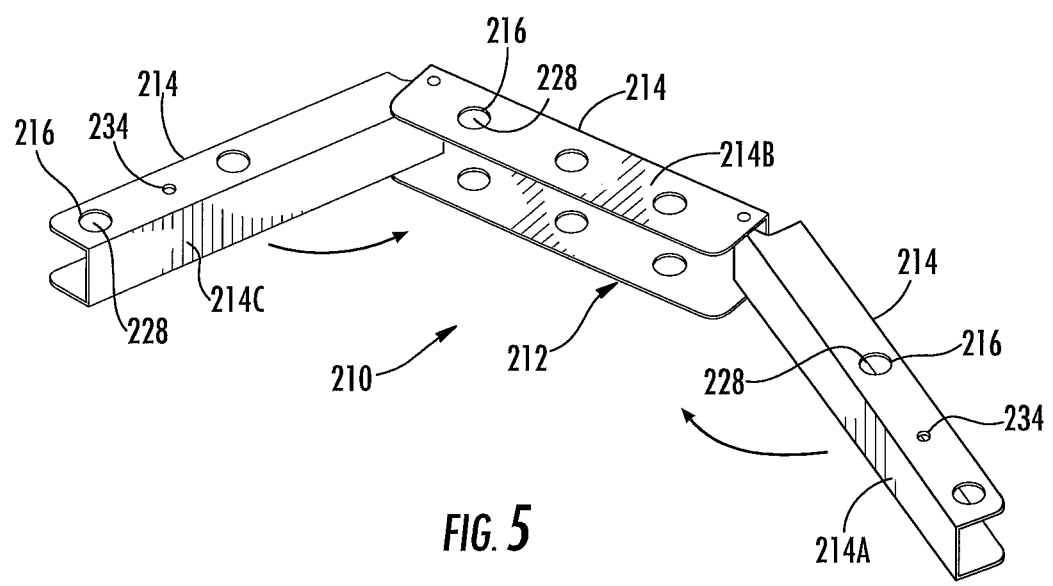
FIG. 5 is a perspective view of a third embodiment of an apparatus for erecting a hunting blind according to the present invention.

In the embodiment of FIG. 5, a hunting blind apparatus 210 is shown having a frame 212 comprised of three frame members 214 pivoted end to end to one another. Each frame member 214 in this embodiment has a C-shaped cross-section permitting the frame members 214 to pivot between a storage and transport disposition wherein the frame members 214 are nested with one another, specifically, with one outer frame member 214A nested within the central frame member 214B and the other outer frame member 214C nested within the first outer frame member 214A, as signified by the directional arrows shown in FIG. 5. Each frame member 214 is of a sufficient size to be formed with support elements 216 in the form of enlarged support openings 228 in the upper and lower sides of the frame member 214 for insertion of trees, bushes or limbs Each frame member 214 further includes holes 234 to receive ground-penetrating stakes (not shown).

Figure 6:
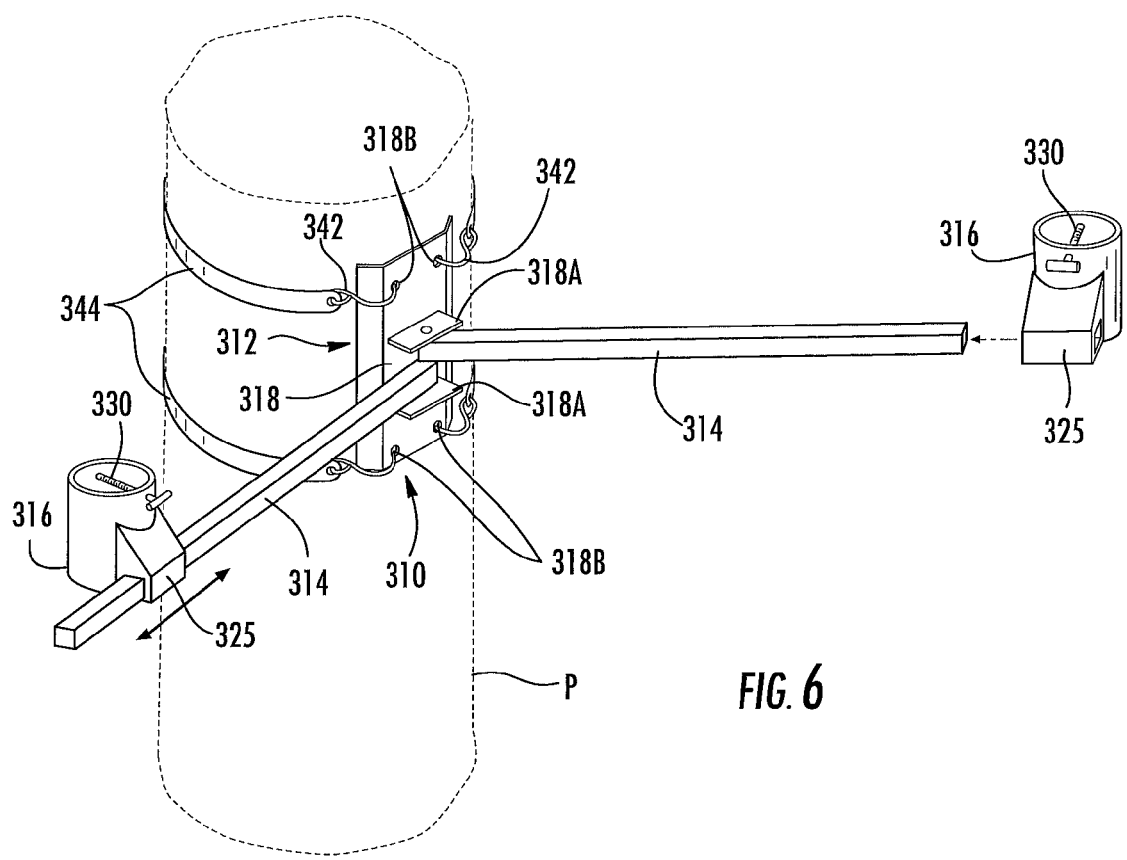
FIG. 6 is a perspective view of a fourth embodiment of an apparatus for erecting a hunting blind according to the present invention.

In the embodiment of FIG. 6, a hunting blind apparatus 310 is shown in a form adapted to be mounted to a vertical surface, such as a tree or pole, shown only in broken lines at P. The apparatus 310 includes a frame 312 having a main central frame member 318 formed with vertically spaced flanges 318A between which a pair of frame members 314 are pivotably mounted to permit selective pivoting movement toward and away from one another into various angular orientations. Each frame member 314 carries a respective support element 316 having a tubular attachment bracket 325 by which each support element 316 is selectively slidable along its respective frame member 314. Each support element 316 is in the form of a tubular support body 326 which threadedly carries a clamping bolt 330 to secure trees, bushes and/or limbs in upright disposition. The main central frame member 318 is formed with upper and lower pairs of holes 318B by which attachment hooks 342 on the ends of attachment straps 344 may be engaged with the frame member 318 to encircle a tree, post or other vertical member to secure the apparatus 310 in place thereon. This embodiment of the present apparatus is particularly useful by hunters using tree stands to hunt from an elevated position. The apparatus 310 may be strapped as described to a tree or post immediately beneath the hunter's tree stand such that trees, bushes and/or limbs secured in the support elements 316 will serve to conceal the hunter while in the tree stand.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

What is claimed is:

1. Apparatus for erecting a hunting blind, comprising a frame including at least one movable frame member for selective orientation in a configuration defining a blind outline, and a plurality of vegetation support elements spaced apart on the at least one frame member, each support element defining an opening sized and configured for insertion of an item of vegetation and having a clamping element for securing the vegetation item in an upright disposition to conceal a hunter behind the blind outline, wherein each vegetation support element is movable along the at least one frame member for selective positioning of the support bodies relative to each other.

2. Apparatus for erecting a hunting blind according to claim 1, wherein the at least one frame member is pivotable relative to another portion of the frame.

3. Apparatus for erecting a hunting blind according to claim 2, wherein the at least one frame member comprises a pair of frame members pivotable relative to one another.

4. Apparatus for erecting a hunting blind according to claim 3, wherein the at least one frame member comprises three frame members pivotable relative to one another.

5. Apparatus for erecting a hunting blind according to claim 1, wherein the at least one frame member is nestable relative to another portion of the frame.

6. Apparatus for erecting a hunting blind according to claim 1, wherein each vegetation support element comprises a tubular support body attached to the at least one frame member.

7. Apparatus for erecting a hunting blind according to claim 6, wherein the tubular support body defines an interior opening sized and configured to contain a severed trunk portion of a complete tree or bush.

8. Apparatus for erecting a hunting blind according to claim 1, wherein the frame is configured for mounting to a generally vertical surface.

9. Apparatus for erecting a hunting blind according to claim 8, further comprising at least one fastener element for securing the frame in a selected position on the vertical surface.

10. Apparatus for erecting a hunting blind according to claim 9, wherein the at least one fastener element comprises a strap for encircling the vertical surface.

11. Apparatus for erecting a hunting blind according to claim 1, wherein the clamping element is supported threadedly by the support element for selective movement into and out of the opening of the support element to engage and hold the item of vegetation therein.

12. Apparatus for erecting a hunting blind, comprising a frame including a central frame member configured for mounting to a generally vertical surface and first and second frame members pivoted to the central frame member for selective pivoting movement of the first and second frame members toward and away from one another into various a selected angular orientations relative to one another for defining a blind outline, and at least two vegetation support elements spaced apart from one another respectively on the first and second frame members, each support element comprising a tubular bracket defining an opening sized and configured for insertion of an item of vegetation and having a clamping element movable relative to the opening of the bracket for securing the vegetation item in an upright disposition therewithin to conceal a hunter behind the blind outline.

13. Apparatus for erecting a hunting blind according to claim 12, wherein each bracket is movable along the respective first and second frame member for selective positioning of the brackets relative to each other.

* * * * *